Figures 1, 2:
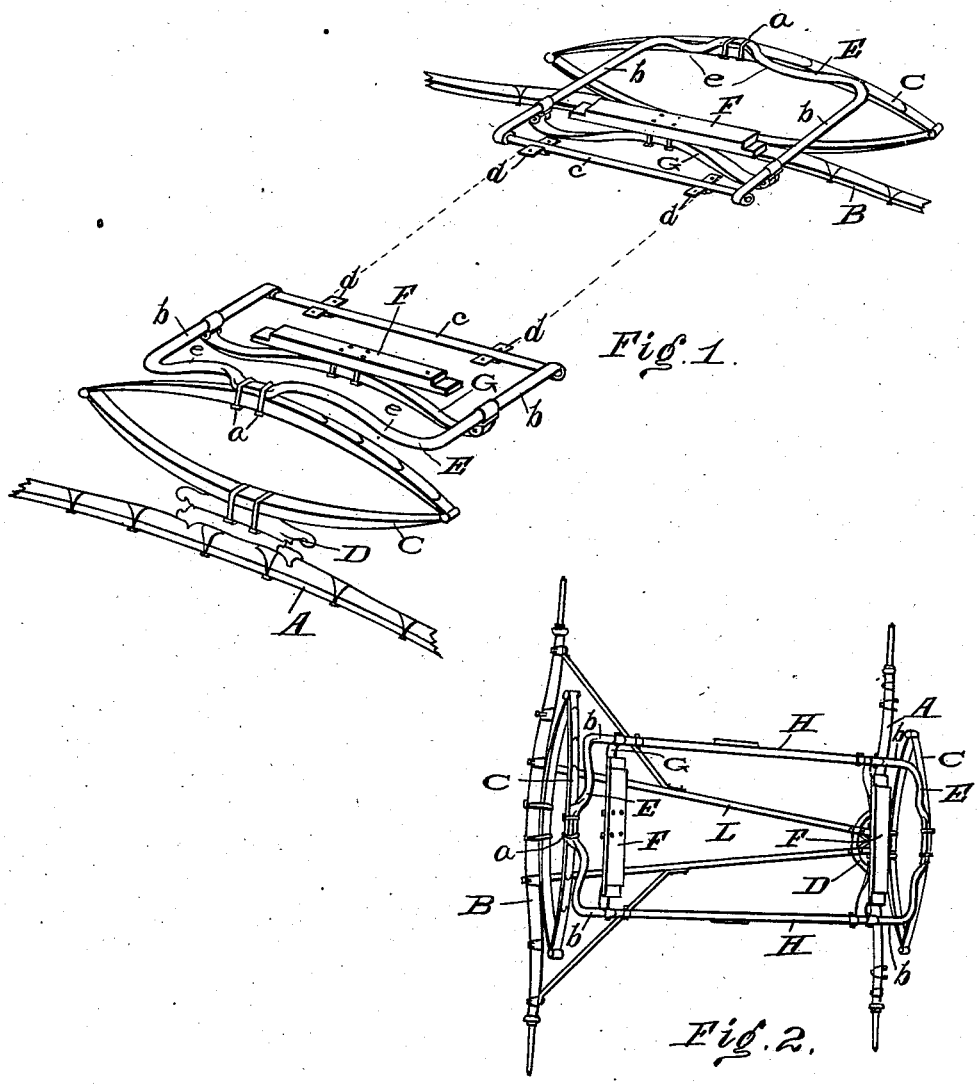

No. 724,421. PATENTED APR. 7, 1903.
A. ARMSTRONG.
SPRING FOR VEHICLES.
APPLICATION FILED OCT. 29, 1902.
NO MODEL.

Witnesses
W. S. Kyle
O. M. Rogers

Inventor
Albert Armstrong
by Alfred M. Allen
Attorney

UNITED STATES PATENT OFFICE.

ALBERT ARMSTRONG, OF CINCINNATI, OHIO.

SPRING FOR VEHICLES.

SPECIFICATION forming part of Letters Patent No. 724,421, dated April 7, 1903.

Application filed October 29, 1902. Serial No. 129,250. (No model.)

*To all whom it may concern:*

Be it known that I, ALBERT ARMSTRONG, a citizen of the United States, and a resident of Cincinnati, in the county of Hamilton and State of Ohio, have invented certain new and useful Improvements in Springs for Vehicles, of which the following is a full, clear, and exact description, reference being had to the accompanying drawings, forming part of this specification.

The purpose of my invention is to secure neat and very elastic springs for the vehicle without sacrificing strength and durability and an arrangement in which the bed of the vehicle may rest securely in such manner as to relieve the strain and wrenching of the corners of the vehicle-body.

In the drawings, Figure 1 is a perspective view of my improvements as applied to a vehicle without side bars. Fig. 2 is similar perspective view as applied to a side-bar construction.

A is the front and B is the rear axle of the vehicle.

C C are elliptical springs of the usual construction, mounted in front on the fifth-wheel plate D and in the rear upon the rear axle. Secured by clips $a$ $a$ at the middle portion of the upper surface of the elliptical springs C C are the metallic spring loops or frames E E, comprising spring side bars $b$ $b$ and end spring portions $e$ $e$. A form of the end portions $e$ $e$ well adapted for my purpose is that of a bow, such form permitting free play of the parts and providing as small a bearing as is consistent with strength for said end portions upon the elliptic springs.

F F are the bolsters or body-bars upon which the bed of the vehicle is mounted, which bolsters are mounted on the springs G G, coupled at the ends to the side extensions $b$ $b$ of the loops E E. The ends of the loops E E are connected by the cross bars or rods $c$ $c$, and these cross-rods are bolted to the bed of the vehicle by the clips $d$ $d$. We have by this construction a tri-part spring connection between the vehicle-body and the axles, which tri-part spring connection is made up of the spring between the bolster connecting same to the sides of the loops, the spring-loop connection with the middle portion of the elliptical spring, and the elliptical spring itself.

By means of this tri-part spring connection all parts of the spring may be constructed very strong to accommodate the weight in the bed of the vehicle and so that it will still carry the bed and weight with a very easy motion and without straining or injuring the springs.

Of course it will be understood that the particular form of spring for connecting the bolster to the spring-loop and the particular form of elliptic spring shown in the drawings are not essential features, the essential thing being the connection of the bolster with the spring-loop by any of the well-known kinds of springs, and the connection of the spring-loop at its middle portion to a suitable spring connection with the front and rear axle, so that by reason of this construction we have a rocking spring connection between the spring connection for the vehicle-bed and the spring connection for the axle.

In the modification shown in Fig. 2 I have connected the inner ends of the parallel sides $b$ $b$ of the spring-loops E by the side bars H H, and as in this construction the side bars H H form a connection between the loops the cross-bars $c$ $c$, with their attaching-clips $d$ $d$ for the bed, may be omitted.

It will be noticed that the bolsters and the vehicle-bed secured thereon are located inside the side arms $b$ $b$ of the spring-loops whether side bars are employed or not and that the spring-loops form no part of the frame of the vehicle-body. The front and rear axles are connected by the usual reach L, which has been omitted from the illustration in Fig. 1.

Having thus described my invention, what I claim, and desire to secure by Letters Patent, is—

1. In a vehicle-spring the combination with the axle, of an elliptic spring mounted thereon, a spring loop or frame comprising side bars of spring metal and an end spring portion, said end portion being centrally mounted on said elliptic spring, and a bolster-spring mounted between and supported by said side bars.

2. In a vehicle-spring, the combination with the front and rear axles, of elliptic springs mounted thereon, spring loops or frames comprising side bars of spring metal and end spring portions, said end portions being centrally mounted on said elliptic springs, and bolster-springs mounted between and supported by said side bars.

3. In a vehicle-spring, the combination with the front and rear axles, of elliptic springs mounted thereon, a spring frame or loop comprising side bars of spring metal and end spring portions, said end portions being centrally mounted on said elliptic springs, and bolster-springs mounted between and supported by said side bars.

ALBERT ARMSTRONG.

Witnesses:
ALFRED M. ALLEN,
ELSIE SEAMER.